March 8, 1966 J. PETTAVEL 3,238,840
APPARATUS FOR DEFINING THE POSITION OF A MOVABLE MACHINE PART
Filed Oct. 23, 1962 6 Sheets-Sheet 1

March 8, 1966  J. PETTAVEL  3,238,840
APPARATUS FOR DEFINING THE POSITION OF A MOVABLE MACHINE PART
Filed Oct. 23, 1962  6 Sheets-Sheet 6

_United States Patent Office_

3,238,840
Patented Mar. 8, 1966

3,238,840
APPARATUS FOR DEFINING THE POSITION
OF A MOVABLE MACHINE PART
Jacques Pettavel, Geneva, Switzerland, assignor to Societe
Genevoise d'Instruments de Physique, Geneva, Switzerland, a Swiss company
Filed Oct. 23, 1962, Ser. No. 232,406
Claims priority, application Switzerland, Nov. 24, 1961, 13,738/61
2 Claims. (Cl. 88—14)

The present invention has for its object an apparatus for defining the location of a movable part of a machine tool or of a measuring machine by means for instance of a standard rule carrying a highly accurate scale.

Apparatuses of this type, as resorted to hitherto, show various drawbacks. When defining of the accurate position of a movable part of a machine tool or of a measuring machine through the agency of a standard scale carrying a highly accurate scale, the spacing between the subdivisions of the scale is a high multiple of the desired accuracy and requires an exaggeratedly large amplification either through magnifying optic means, or else electronic means. Now, the field of observation of such apparatuses is considerably reduced when the amplification is larger, since any increase in the breadth of the field beyond a predetermined limit introduces distortion. As a matter of fact, the location of the movable part can be quite accurately defined only in the vicinity of the center of the observation field.

The difficulty of the problem to be solved, which is considerable when the accuracy sought for is of the magnitude of one thousandth of a millimeter, increases when the accuracy required is larger.

In conventional structures, the means defining the exact location of a part, providing a large amplification of a reduced field of observation, are associated with rough adjusting means for which the amplification is smaller and the field larger.

One of the best known arrangements of this type includes a standard rule wherein the successive scale subdivisions are spaced by one millimeter. Said scale is projected after magnification onto a screen by means of optic means operating on at least two successive subdivisions of the scale. On the screen, a movable reference wark connected mechanically with a micrometric drum allows defining fractions of a subdivision of the scale. Said arrangement for accurately defining a location is associated with a rough reference system constituted by a pointer moving in registry with a rule carrying numbered subdivisions adapted to be read by the naked eye.

According to a modification of this arrangement, the rough reference system is constituted by a scale-carrying drum connected mechanically with the movable part, the drum scale appearing adjacent the screen. Said arrangement is more advantageous than the precedingly referred to arrangement since it allows the operator to see at a glance, both the indications provided by the arrangement accurately defining a location and also those provided by the rough reference means.

Such arrangements are highly suitable for defining locations with an accuracy of a magnitude of one thousandth of a millimeter. Beyond said magnitude, it would be necessary to provide highly intricate arrangements for correcting distortion, whereas the increase in the magnification would lead to giving the optical means and the screen a size such that their bulk and cost price would be prohibitive and the luminosity would be much too low.

Similar difficulties arise in the case of electronic arrangements providing their own distortion when the field they are to sweep increases.

My invention has now for its object an apparatus for defining the location of a movable part of a machine-tool or of a measuring machine, which arrangement removes such drawbacks.

Said apparatus includes at least one scale-carrying standard rule, means for magnifying with a large magnification the scale on the rule so as to define accurately the location of the movable part and means for magnifying said scale with a reduced magnification for the rough adjustment of said position.

According to my invention, each of said magnifying means includes optical means which allow returning towards the axis of the corresponding observation field the image of each scale graduation marks of which is to be examined when said mark lies away from said axis, while further means are provided for measuring the displacement required for the image of the mark to register with the axis of the observation field in each magnifying means.

There is illustrated by way of example in the accompanying drawings, a preferred embodiment of the invention as applied to a measuring machine. In said drawings.

Figure 1:
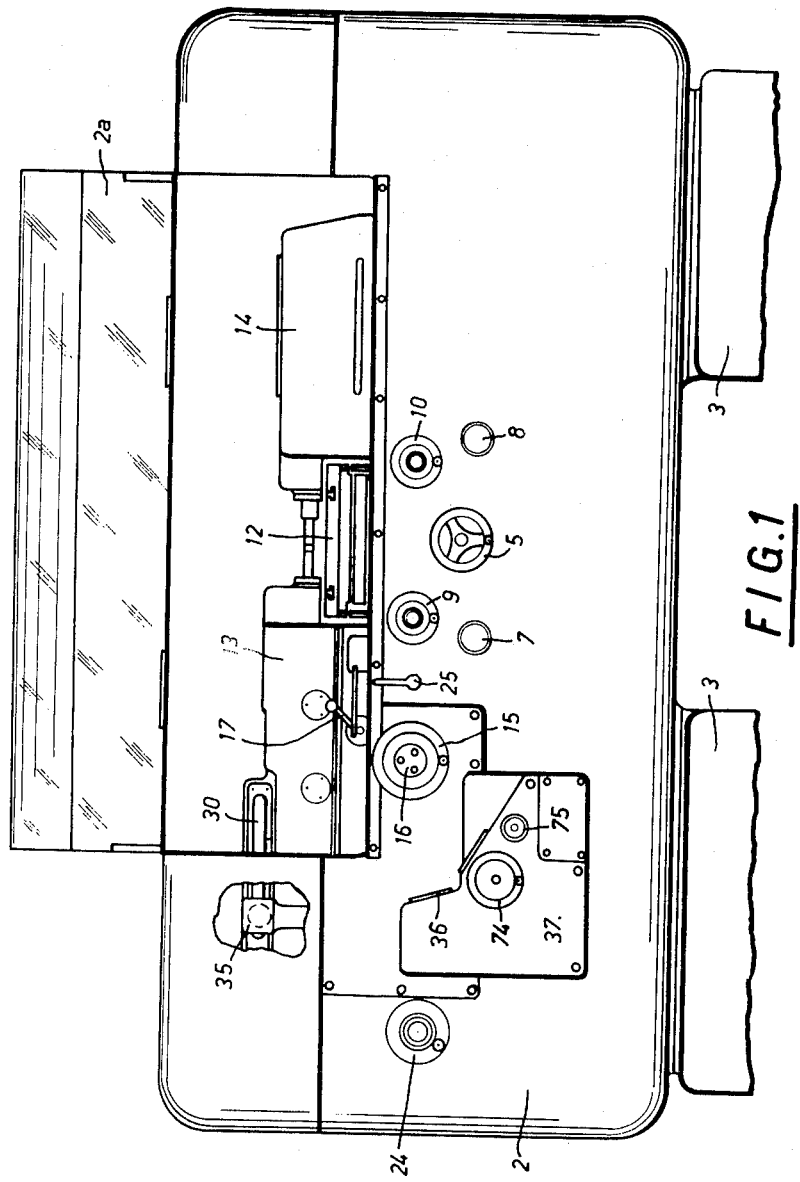
FIG. 1 is a front elevational view of the measuring machine.
Figure 2:
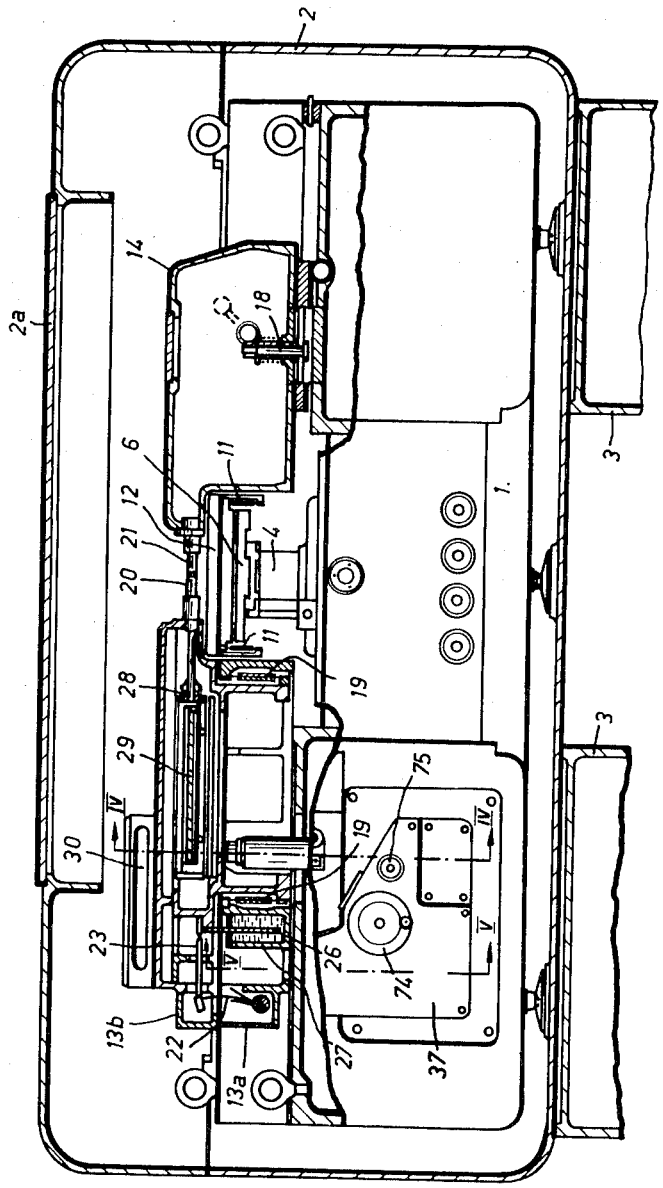
FIG. 2 is a partial longitudinal cross-section of said machine.

As illustrated in FIGS. 1 and 2, the frame 1 of a measuring machine is carried at three points by the bottom of an insulating casing 2 provided with a transparent removable cover 2a and resting on the feet 3.

The central section of said machine frame carries a slider 4 adapted to move longitudinally under the control of a handwheel 5, said frame including also means which are not illustrated and which allow tilting longitudinally and transversely a second slider 6 and modifying its position through operation of the knobs 7 and 8 on the one hand and of the handwheel 9 on the other hand. Over said slider 6 of which the transverse shifting is obtained by operation of a further hand-wheel 10, there is suspended by means of elastic blades 11, a table 12 adapted to carry the parts to be measured.

To either side of the table 12 are fitted two headstocks 13 and 14 adapted to move longitudinally over the frame in opposite directions. Said headstocks are manually controlled, and their speedy shifting is ensured by a handwheel 15 whereas their slow movement is controlled by a knob 16 carried coaxially by said handwheel 15. 17 and 18 designate means for locking the headstocks 13 and 14 in any desired position.

The headstock 13 is constituted by a support 13a and a body 13b extending partly inside said support over which said body is suspended by elastic blades 19. The front end of the body 13b is provided with a feeler 20 facing a feeler 21 rigid with the other headstock 14.

The feeler 20 is urged against the part to be measured and which is not illustrated, under a predetermined pressure exerted by the yielding blade 22 of which one end acts axially on the body 13b of the headstock, through the agency of a pivotally mounted rod 23, while its other end is rigid with the spindle of a handwheel 24 (FIG. 1). The rotary shifting of said handwheel in either direction corresponds to a more or less marked bending of the blade 22 and to a corresponding modification of the pressure exerted on the feeler.

To allow measurement of a number of similar parts without it being necessary to adjust each time the spacing between the feelers 20 and 21, the machine includes a link-work which is not illustrated and of which one end is rigid with the headstock body 13b while its other end is connected with a lever 25 pivotally secured to the frame. The rocking of said lever, for instance towards the left hand side, produces a corresponding shifting of the body 13b with reference to the support 13a of the headstock, against the action of the spring blades 19 and 22. The return movement of the body 13b into its position of equilibrium is slowed down by a hydrodynamic brake constituted by a plate 26 immersed in a vat 27 containing a liquid such as oil and rigid with the support 13a of the headstock 13.

Inside the body 13b of said headstock 13 is housed a casing 28 enclosing a highly accurate standard rule 29, the successive scale subdivisions of which are spaced for instance by 1 mm. Above said rule is arranged a second transparent rule 30, intended for a rough measurement and the scale of which carries for instance numeric indications at each millimeter. 31 and 32 designate glasses protecting the rules 20 and 30 as shown in FIG. 3.

Figure 3:
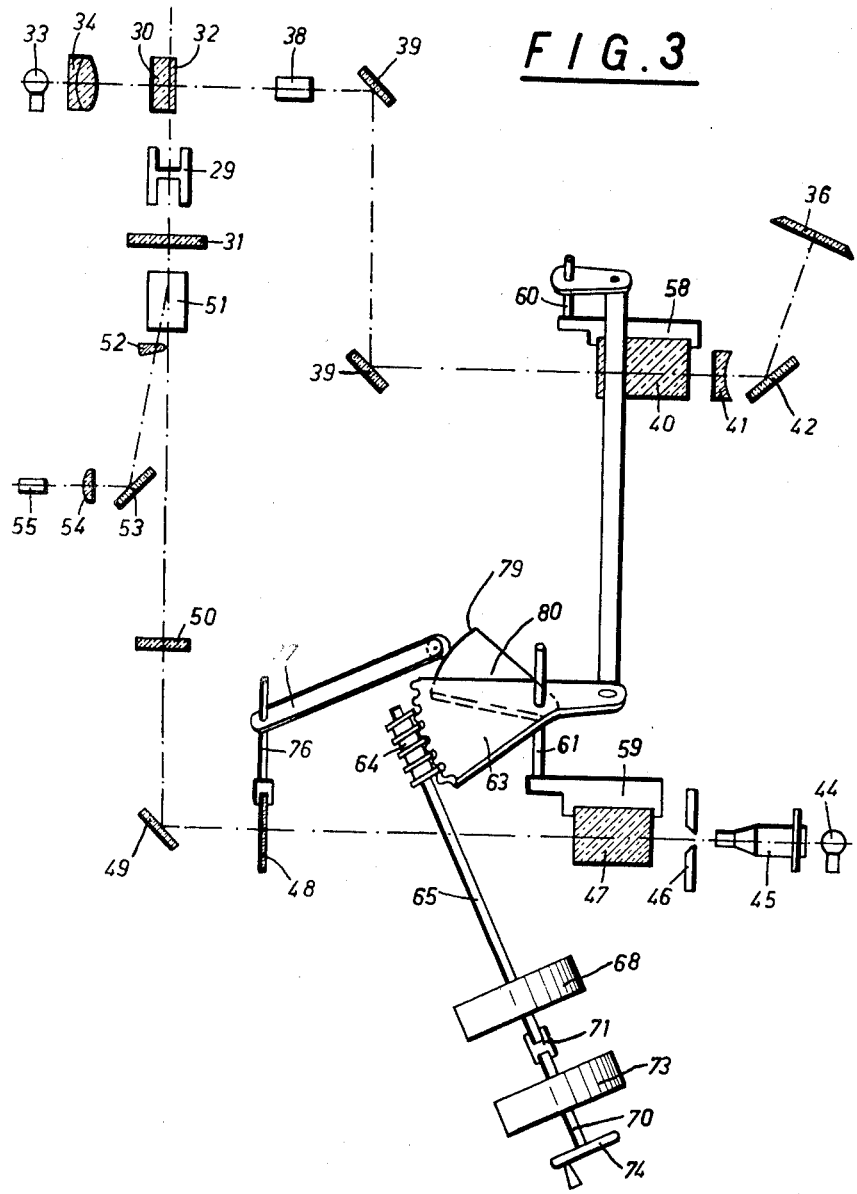
FIG. 3 illustrates diagrammatically the principle underlying the location-defining means, FIG. 2.
Figure 4:
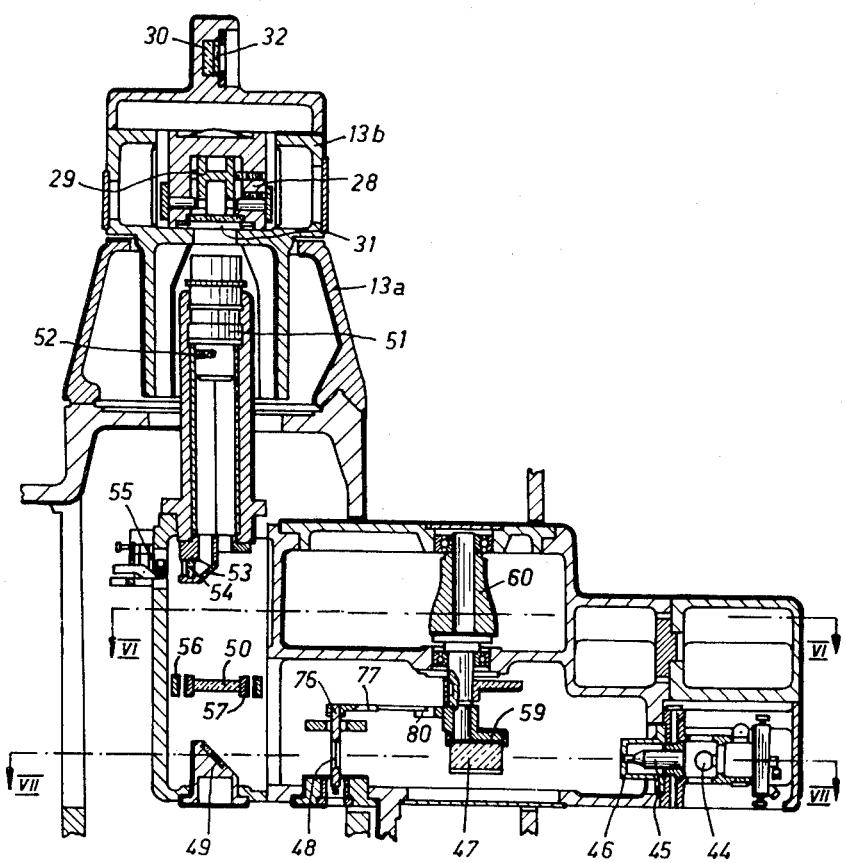
FIG. 4 is a cross-section through line IV—IV of FIG. 2.
Figure 5:
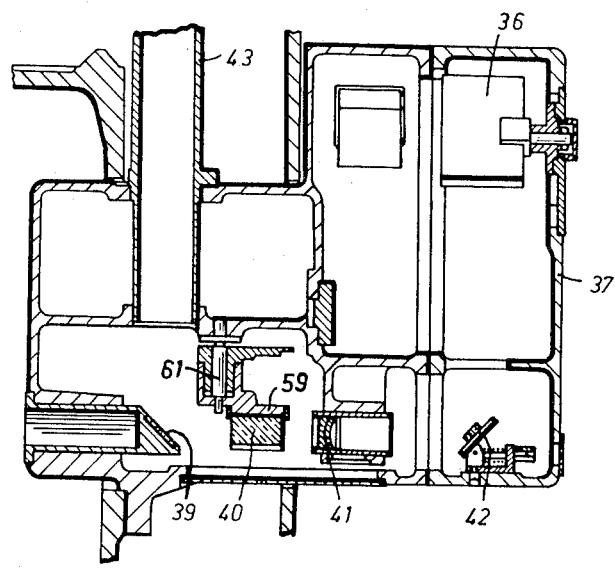
FIG. 5 is a cross-section through line V—V of said same FIG. 2.

The rule 30 illustrated in FIG. 3 is illuminated by a light beam the width of which is at least twice the distance separating two successive graduation marks, said beam being produced by a bulb 33 and projected through a condenser 34. This bulb and this condenser are fitted inside a sleeve 35 rigid with the frame and extending perpendicularly to the rule 30 (FIG. 1). The image of the illuminated scale graduations is projected with a comparatively small magnification by an optical device illustrated in FIGS. 3 and 5 onto a translucent screen 36 carried by a desk 37 rigid with the frame 1 of the machine. The optic projecting means provided for this purpose are constituted by an objective 38 located in the optical axis of the condensing lens 34, two reflecting mirrors 39, a plane movable glass block 40, a second objective 41 and a mirror 42. The objective 38 and the mirror 39 are mounted in the upper section of a sleeve 43 (FIG. 5).

Standard rule 29 is illuminated by a beam of light which is wider than one of the graduation marks, but is much narrower than the distance separating two adjacent graduation marks on the scale. Said beam is projected onto said rule 29 by an optical system including (FIG. 3) a source of light 44, a condensing lens 45, a plate 46 having a slit allowing a sweeping of the beam produced by the source of light 44, a plane movable glass block 47, a correcting glass 48, a mirror 49, an oscillating deflector 50 and an objective lens 51. The image formed by the beam on the rule 29 is transmitted by the objective 51 through a prism 52, a mirror 53 and a lens 54, to a photo-cell 55 the output current of which is transformed by an electronic system, which is not illustrated, of the type described in the Swiss Patent No. 280,542 into current pulses fed to a milliammeter also not illustrated and fitted inside the desk 37 adjacent the screen 36.

The oscillating deflector 50 is constituted by a glass plate, surrounded by a winding 57 and fitted on a spindle which is not illustrated and which is adapted to rock against the action of its elastic suspension means which are not illustrated such as blade or spiral springs for instance. Said deflector is arranged inside a permanent magnet 56 in a manner such that, when the winding 57 is fed with A.C. of a predetermined frequency, it is subjected to an oscillation of the same frequency. Of course, the natural frequency of the system constituted by the deflector, its spindle and its elastic suspension should be selected so as to be sufficiently different from that of the feed circuit and to prevent thus the oscillations of said system from being resonant. This oscillation of the deflector shifts the beam from the source 44, which is projected onto standard rule 29, to either side of the scale subdivision, the point of impact of the pencil on the rule executing a movement governed by a sinusoidal law. The amplitude of this sweeping movement depends on the amplitude of oscillation of the deflector and on its thickness; in the machine described, said amplitude is comparatively small and is such that the sweeping of the projected luminous pencil covers only a fraction of the distance separating two successive scale subdivisions on the standard rule.

When the luminous pencil passes over the groove formed by a subdivision of the rule 29, which groove constitutes an unevenness in the polished surface of the latter, the amount of reflected light in the direction of the cell 55 will be subjected to a sudden variation, which produces an electric pulse in the cell. Said periodical pulse is transformed for instance in the manner described in the above-mentioned Swiss Patent No. 280,542, into a rectangular current pulse the duration of which corresponds to the time interval separating two successive impacts of the luminous pencil on the subdivision line thus illuminated during the oscillating movement of said pencil.

If said subdivision line lies exactly along the axis of the oscillatory field of the pencil, the rectangular pulses obtained will all be of a same length and alternately positive and negative, the positive pulses corresponding to a shifting of the luminous beam to the left hand side of the subdivision line, the negative pulses, to its shifting towards the right hand side of the latter. If, in contradistinction, the observed line is spaced with reference to the axis of the sweeping range of the luminous beam, the rectangular pulses obtained are of different lengths, as provided by the difference between the distances separating the ends of the sweeping range of the beam from the subdivision line. As precedingly described, the pulses thus obtained are fed to a milliammeter, showing a high inertia and the position of equilibrium of which sets the indicator hand centrally of a symmetrical dial.

When the observed line extends exactly along the center of the area swept by the luminous beam and consequently the pulses received by the milliammeter are all of equal lengths, the hand of the latter remains stationary along the center line of the dial. In fact, the inertia of the instrument does not allow the hand to follow the individual pulses of current fed into said instrument and which are in succession positive and negative.

When, in contradistinction, said observed line is not centered with reference to the area swept by the beam and consequently when the current pulses are of different lengths, the hand of the milliammeter is subjected to the difference between the unequal stresses of opposed directions and therefore it assumes a position of equilibrium which defines, with a predetermined magnification, the spacing between the subdivision line on the rule and the center of the oscillatory area of the luminous beam registering with the optic axis of said beam. Of course, the milliammeter acts only when the scale subdivision observed lies inside the oscillatory area of the luminous pencil.

Figure 6:
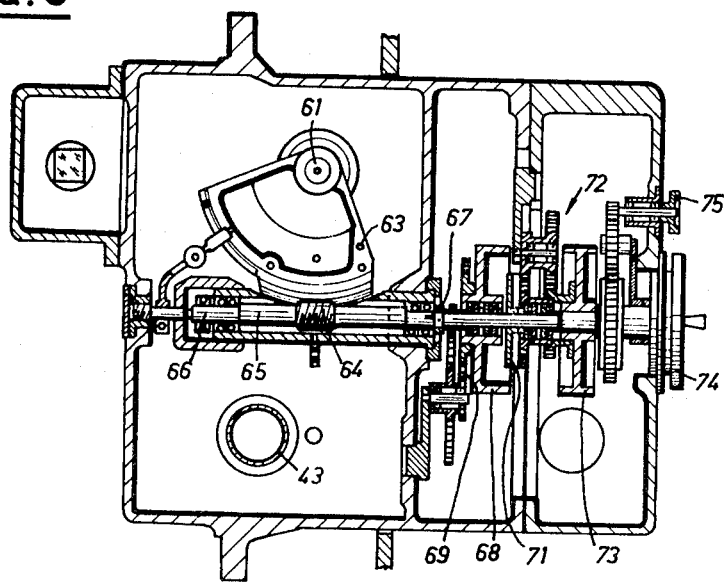
FIG. 6 is a cross-section through line VI—VI of FIG. 4.
Figure 7:
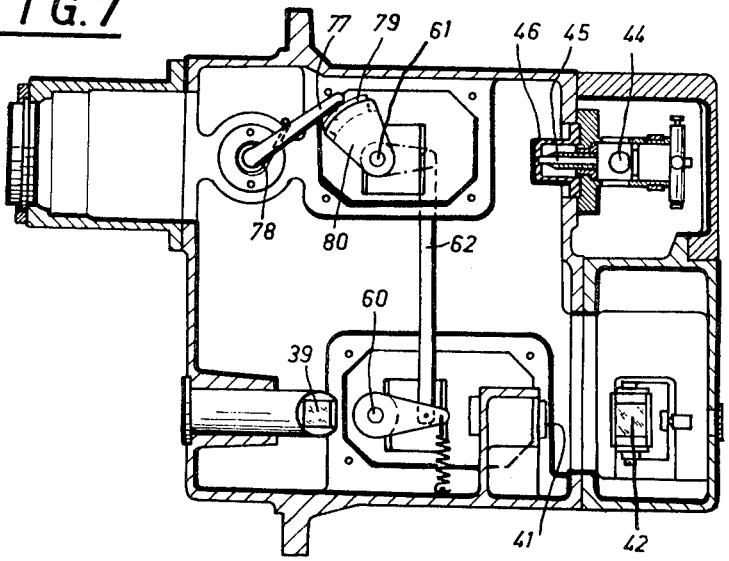
FIG. 7 is a cross-section through line VII—VII of said FIG. 4.

The glass panes 40 and 47 are rigid respectively with levers 58 and 59 rotating with the corresponding spindles 60 and 61. The movements of the spindle 60 are synchronized with those of the spindle 61 through a transmission link 62. On the spindle 61 is mounted a toothed sector 63 meshing with a worm 64 formed on a shaft 65 pivotally carried by the desk at 66 and 67 (FIG. 6) and on which is fitted a drum 68. The edge of the latter carries a numeric scale and is adapted to move in front of a gate, not illustrated, and which is provided in the desk underneath the milliammeter.

The rotary movement of said drum is controlled by the rotation of the shaft 65 through the agency of a speed reducing gearwork 69. Said shaft 65 is connected kinematically with a control shaft 70 through the agency of a coupling 71 and to said shaft 70 is secured a second drum 73 which is driven by the gearwork 72, and also carries along its edge a numeric scale. Said drum 73 is adapted to move in front of a second gate provided in the desk, said gate, which is not illustrated, being adjacent the first-mentioned gate. There are also provided a handwheel 74 for the rough control of the rotation of the shaft 70 and a micrometric control knob 75 for said rotation. The angular shifting of the handwheel 74 in either direction provides thus, with a considerable speed reduction, a corresponding shifting of the glass blocks 40 and 47. If the latter are positioned in a manner such that the luminous pencils produced respectively at 33 and at 44, are not perpendicular to said glass blocks, said pencils are refracted and follow, after their passage through said glass blocks, different paths according to their angles of incidence. Thus the luminous pencil which is projected onto the screen 36 may be shifted over the latter until the image of the subdivision line registers with a reference line drawn for instance on the medial section of said screen. Similarly the luminous pencil produced at 44 may be shifted in a manner such that it impinges on the corresponding subdivision line on the rule 29 whereby said line extends very accurately at the center of the area swept by said beam.

Of course, the position and size of the rules 29 and 30 as well as the components of the corresponding optic systems and the parts controlling the angular shifting of the parallel sided glass blocks 40 and 47 are such that through rotation of the handwheel 74 or of the knob 75, the luminous pencils are shifted simultaneously by corresponding amounts in both optic systems. Thus the shifting of the image of a subdivision line of the rule 30 will correspond to a shifting of the ammeter hand with reference to the zero digit of its dial.

The spacing between the position of a subdivision line on the rule 30 and that of the center of the oscillatory area of the pencil projected on said rule, when surfaces of the glass block 47 are perpendicular to the beam of the source 44, and which corresponds to a fraction of a subdivision, may be measured through the agency of the drums 68 and 73. The latter are kinematically interconnected, the speed of the drum 68 being highly reduced with reference to that of the drum 73, for instance in a manner such that for each complete rotation of the drum 73, the drum 68 is angularly shifted by one scale subdivision. The drums 68 and 73 may for instance be subdivided into 100 parts and their relative speed may be sufficiently reduced so that the drum divisions may correspond for instance to a measured spacings of 0.10 and 10 respectively.

Since the law governing the shifting of the luminous pencil through a plane parallel glass block is not an exactly linear function of the angle of incidence, the arrangement is therefore provided with a further block 48 which is rigidly secured to a shaft 76 pivotally carried by the desk, one end of said shaft 76 being provided with an arm 77 bearing, under the action of a spring 78, against the surface of a cam 79 carried by a sector 80 rigid with the shaft 61. The cam 79 provides the correction to be made as a function of the angular position of the glass block 47, in order that the pencil issuing from the latter along a path slightly diverging from the desired theoretical path may be returned by their passage through the further glass block 48 onto said theoretical path they should have followed in accordance with a linear law of refraction.

What I claim is:

1. Apparatus for determining the position of a movable member of a machine relatively to an axis comprising:
    (A) a standard scale for accurately defining the position of said movable member, and having graduation marks thereon;
    (B) a transparent scale positioned above said standard scale for approximately defining the position of said movable member;
    (C) optical projecting means having a given optical axis for forming on a screen a greatly magnified image of said standard scale graduations, said means including a light source;
    (D) optical means for projecting an image of the same scale with less magnification as an approximate indication of the position of said movable member;
    (E) two optical displacement devices one being in the optical axis of each of said projecting means and including a movable plane parallel deflecting glass block for bringing said images of said graduations into coincidence with the said axis, said optical devices being coupled together for synchronous movement by mechanical means co-operatively linking said deflecting blocks thereof;
    (F) photoelectric means having a measurable output for indicating any difference between a reference line on said scale and the said axis, said means including a source of light projecting a narrow beam of light on to the scale and an oscillating deflector imparting a sweeping movement to said beam of light the amplitude of said movement being greater than the width of a graduation mark on the scale but less than the distance between two successive graduation marks on the scale and a current measuring device receiving the output of said photo-electric means to indicate current deviations linearly proportional to the distance between the graduation mark on the scale and the said axis.

2. The device of claim 1, wherein a plate having a slit is provided intermeditae said source of light projecting a narrow beam of light on to the scale and said oscillating deflector for determining the sweeping of the beam produced by said source.

References Cited by the Examiner
UNITED STATES PATENTS
3,068,741  12/1962  Werner _____ 88—1 XR FOREIGN PATENTS
684,435  12/1952  Great Britain.

OTHER REFERENCES
German printed application No. 1,132,344, June 1962.

JEWELL H. PEDERSEN, *Primary Examiner.*

W. L. SIKES, *Assistant Examiner.*